United States Patent [19]

Dille et al.

[11] Patent Number: 4,462,928

[45] Date of Patent: Jul. 31, 1984

[54] PARTIAL OXIDATION OF HEAVY REFINERY FRACTIONS

[75] Inventors: Roger M. Dille, Port Arthur; Harold A. Rhodes; Susan B. Wallon, both of Beaumont, all of Tex.

[73] Assignee: Texaco Inc., White Plains, N.Y.

[21] Appl. No.: 480,637

[22] Filed: Mar. 31, 1983

[51] Int. Cl.³ .................... B01D 3/34; C07C 1/02; C10K 1/10; C01B 3/24; C01B 3/36

[52] U.S. Cl. .................... 252/373; 252/374; 48/197 R; 203/52; 203/69; 203/70

[58] Field of Search .................... 252/373; 48/197 R

[56] References Cited

U.S. PATENT DOCUMENTS 3,349,029 10/1967 Cheng .................... 48/197 R
3,980,590 9/1976 Marion .................... 252/373
4,099,932 7/1978 Child .................... 48/197 R Primary Examiner—Natalie Trousof
Assistant Examiner—Bruce D. Gray
Attorney, Agent, or Firm—Robert A. Kulason; Albert Brent

[57] ABSTRACT

This is a partial oxidation process in which heavy hydrocarbonaceous fractions from a petroleum refinery and light liquid paraffinic hydrocarbon extractants are used in the production of synthesis gas, reducing gas, or fuel gas i.e. gaseous mixtures comprising $H_2$ and CO. In the process, substantially all of the particulate carbon and soot that are simultaneously produced are recovered and recycled to the reaction zone. A dispersion of carbon-soot-light paraffinic hydrocarbon extractant from the decanting zone is combined with a heavy refinery fraction in admixture with a liquid aromatic-rich hydrocarbon to produce a pumpable single liquid phase mixture which is introduced into a fractionation zone where the following streams are separated from each other: (a) a stream of light paraffinic hydrocarbon extractant which is recycled to the decanting zone, (b) a stream comprising at least a portion of the aromatic-rich hydrocarbon which is recycled for mixing with the heavy refinery fraction, and (c) a stream of pumpable dispersion of carbon-soot heavy refinery fraction and any remaining aromatic-rich hydrocarbon which may be used as fuel in the system or exported. Troublesome asphaltene precipitation that causes operational problems and increased viscosity is avoided by the subject process. Comparatively low cost heavy refinery fractions which ordinarily are difficult to handle may be now used along with light liquid paraffinic hydrocarbon extractants.

16 Claims, 1 Drawing Figure

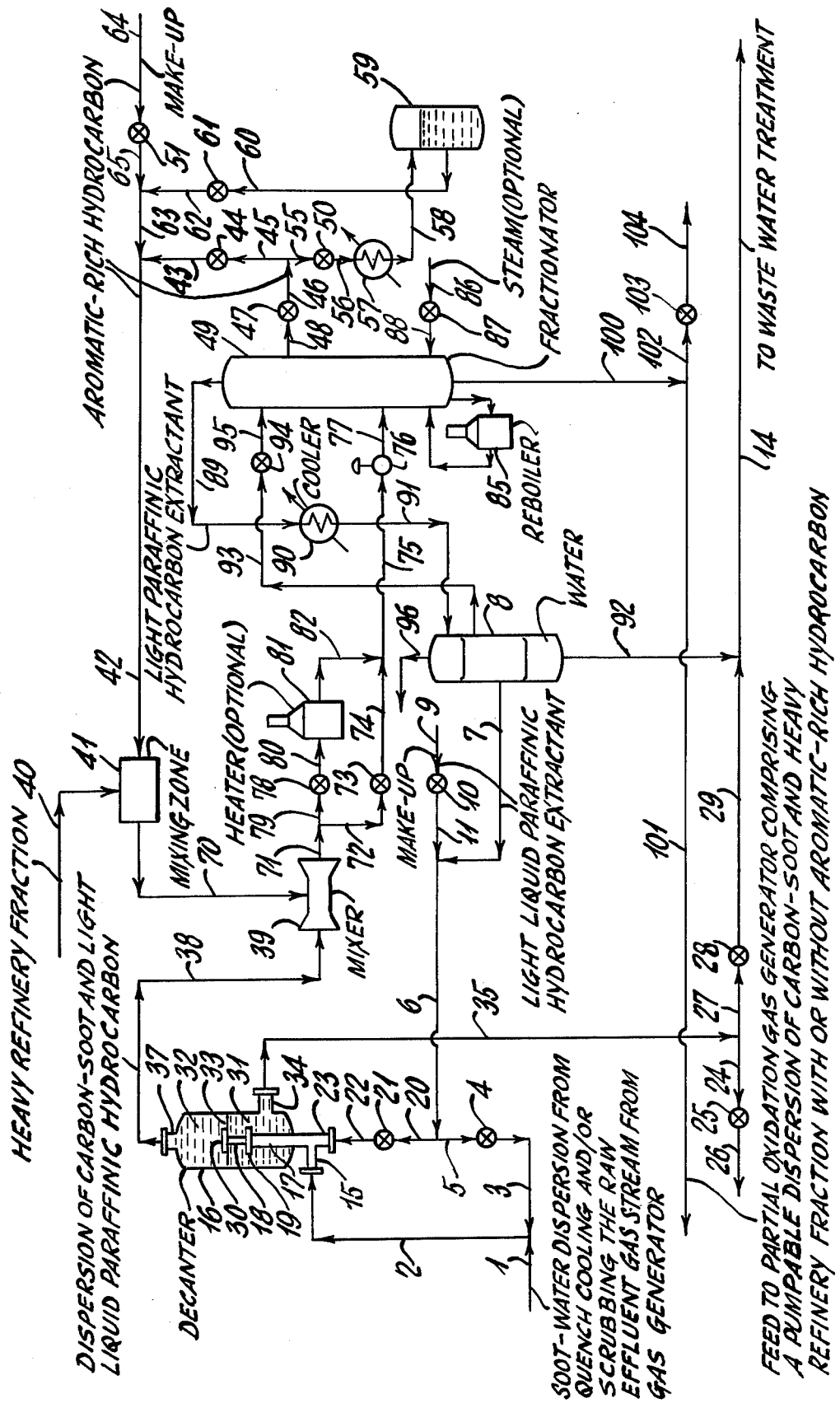

PARTIAL OXIDATION OF HEAVY REFINERY FRACTIONS

BACKGROUND OF THE INVENTION

This invention relates to the partial oxidation process. More specifically, it pertains to the use of heavy refinery fractions and light liquid paraffinic hydrocarbon extractants in the partial oxidation process for producing synthesis gas, reducing gas, or fuel gas.

Gaseous mixtures comprising $H_2$ and CO i.e. synthesis gas, reducing gas, or fuel gas may be prepared from hydrocarbonaceous materials by partial oxidation. Particulate carbon and soot are entrained in the hot raw gas stream leaving the reaction zone of the gas generator. A dispersion of carbon and water is produced when the hot raw effluent gas stream is quenched and/or scrubbed with water. A liquid organic extractant is used to resolve the carbon-water dispersion, and the extractant is recovered by distillation in the manner described in coassigned U.S. Pat. Nos. 2,992,906 and 4,038,186.

It is economically desirable to use in the partial oxidation gas generating process comparatively low cost heavy refinery fractions, such as very heavy residua, or the residues from deasphalting or hydrogenation of residua or heavy oils. However, these materials are difficult to handle since at ordinary temperatures they may range from viscous liquids to solids. Further, when these materials are contacted by light liquid paraffinic hydrocarbons such as light straight run naphtha, asphaltene precipitation results that can cause plugging, carry over of carbon, clogging of pumps, and other operational problems in the system. In addition, the viscosity of the blend is substantially increased thereby impairing pumpability. These difficulties are avoided by the subject improved partial oxidation process.

SUMMARY OF THE INVENTION

This is an improved partial oxidation process for the production of synthesis gas, reducing gas, or fuel gas in which a heavy refinery fraction i.e., very heavy residua, or the residues from deasphalting or hydrogenation of residua or heavy oil is used in the recovery of carbon-soot, and preferably as at least a portion of the feedstock to the gas generator. At least about 85 to 100 wt. % and preferably all of the carbon-soot entrained in the gas stream leaving the gas generator is recovered in a carbon-recovery zone and recycled to the gas generator as a portion of the reactant fuel feedstock.

In the subject process, the hot raw gas stream leaving the reaction zone is quench cooled and/or scrubbed with water. The resulting soot-water dispersion is mixed with a light paraffinic hydrocarbon extractant; and the mixture is introduced into a decanter along with a second stream of light paraffinic hydrocarbon extractant. A stream of particulate carbon-soot dispersed in light paraffinic hydrocarbon extractant is removed from the decanter along with a separate stream of grey water. A heavy refinery fraction is first mixed with a normally liquid aromatic-rich hydrocarbon fraction such as benzene, toluene, xylene, or a gas oil in the amount of about 40 to 95 wt. % of heavy refinery fraction and the remainder comprising aromatic-rich hydrocarbon to produce a pumpable mixture. This mixture is then mixed with the dispersion of carbon-soot-light paraffinic hydrocarbon extractant from the decanter to unexpectedly produce a pumpable mixture comprising a single liquid phase. In one embodiment, the resulting mixture is then separated in a fractionation zone into the following streams which are distributed as follows: (a) a stream of light paraffinic hydrocarbon extractant which is recycled to the decanter; (b) a stream comprising at least a portion of the aromatic-rich hydrocarbon which is recycled for mixing with that portion of the heavy refinery fraction going into the fractionation zone; and (c) a pumpable dispersion of carbon-soot-heavy refinery fraction and the remainder of the aromatic-rich hydrocarbon if any, and wherein from about 0 to 100 wt. %, such as at least a portion of said pumpable dispersion is recycled to the gas generator as at least a portion of the fuel feed, and the remainder, if any of said dispersion stream is removed for use as fuel in the system or for export.

By the subject process, problems such as plugging, carryover of carbon from the fractionator, and other operational difficulties that would come with deasphalting of partial oxidation feed materials are avoided. Further, low-cost heavy refinery fractions which ordinarily are difficult to handle may be now efficiently used along with desirable light paraffinic hydrocarbon extractants in the partial oxidation process for making synthesis gas, reducing gas, or fuel gas.

BRIEF DESCRIPTION OF THE DRAWING

The invention will be further understood by reference to the accompanying drawing. The drawing is a schematic representation of a preferred embodiment of the process.

DESCRIPTION OF THE INVENTION

The present invention pertains to an improved non-catalytic partial oxidation process in which a hydrocarbonaceous fuel comprising a heavy liquid refinery fraction in admixture with carbon-soot is the preferred feedstock. A conventional partial oxidation synthesis gas generator may be used in this process, such as shown in co-assigned U.S. Pat. No. 2,818,326 and U.S. Pat. No. 3,544,291, which are incorporated herein by reference. The gas generator comprises a vertical free-flow unpacked cylindrically shaped steel pressure vessel lined on the inside with refractory. There is no obstruction to the free-flow of the reaction products passing down through the gas generator.

A conventional burner is located in the top of the gas generator, along the central vertical axis, for introducing the reactant feedstreams. A suitable annulus-type burner is shown in co-assigned U.S. Pat. No. 2,928,460, which is incorporated herein by reference.

The reactant feedstreams to the partial oxidation reaction include a stream of hydrocarbonaceous fuel which may include a mixture of heavy liquid refinery fraction and carbon-soot, a stream of free-oxygen containing gas, and a stream of temperature moderator.

The term hydrocarbonaceous fuel as used herein, is intended to include various liquid hydrocarbon materials, such as liquefied petroleum gas, petroleum distillates and residues, gasoline, naphtha, kerosene, crude petroleum, asphalt, gas oil, residual oil, tar-sand oil, shale oil, oil derived from coal, aromatic hydrocarbons (such as benzene, toluene, and xylene fractions), coal tar, cycle gas oil from fluid-catalytic-cracking operations, furfural extract of coker gas oil, and mixtures thereof. Included within the definition of liquid hydrocarbonaceous fuel are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

The terms heavy refinery fraction and heavy hydrocarbonaceous fraction from a petroleum refinery as used herein are synonymous and are intended to include by definition very heavy residua from the refining of petroleum, such as (1) vacuum residuum and the asphalt residuum from solvent deasphalting, and (2) the bottoms product from the hydrogenation and hydrocracking of residua or heavy crude oil. At ordinary temperatures, these materials may be viscous liquids or solids. The heavy refinery fractions contain asphaltenes. Further, they are pumpable at temperatures in the range of about 200° to 700° F., such as about 300° to 500° F., and have the following properties, as determined by conventional test methods e.g. A.S.T.M.

| | |
|---|---|
| Initial Boiling Point, °F. about | 650–1300 |
| Viscosity, SFS @ 300° F. | 40–300 |
| Pentane Insolubles, wt. % about | 5–50 |

The term free-oxygen containing gas, as used herein is intended to include air, oxygen-enriched air, i.e., greater than 21 mole % oxygen, and substantially pure oxygen, i.e., greater than 95 mole % oxygen, (the remainder comprising $N_2$ and rare gases). Free-oxygen containing gas may be introduced into the burner at a temperature in the range of about ambient to 1200° F. The atomic ratio of free-oxygen in the oxidant to carbon in the feedstock (O/C, atom/atom) is preferably in the range of about 0.7 to 1.5, such as about 0.80 to 1.2.

The term temperature moderator, as used herein is intended to include steam, water, $CO_2$-rich gas, liquid $CO_2$, cooled effluent gas from the gas generator, by-product nitrogen from the air separation unit used to produce substantially pure oxygen for use in the gasifier, and mixtures of the aforesaid temperature moderators.

The temperature moderator may be introduced into the gas generator in admixture with either the hydrocarbonaceous fuel such as heavy refinery fraction fuel feed, the free-oxygen containing stream, or both. Alternatively, the temperature moderator may be introduced into the reaction zone of the gas generator by way of a separate conduit in the fuel burner. With $H_2O$ as the temperature moderator, the weight ratio of $H_2O$ to the hydrocarbonaceous fuel, such as heavy refinery fraction fuel plus recycle carbon-soot and any liquid aromatic-rich hydrocarbon is in the range of about 0.3 to 3.0, and preferably in the range of about 0.5 to 1.0.

The relative proportions of hydrocarbonaceous fuel, such as heavy hydrocarbonaceous fraction and recycle carbon, temperature moderator, and free oxygen in the feed streams to the gas generator are carefully regulated to convert a substantial portion of the carbon in the fuel feed to the partial oxidation gas generator e.g. 75 to 95 wt. %, such as 80 to 90 wt. % of the carbon to carbon oxides e.g., CO and $CO_2$ and to maintain an autogenous reaction zone temperature in the range of about 1700° to 3500° F., such as about 2000° to 2900° F. The pressure in the reaction zone is in the range of about 1 to 300 atmospheres, such as about 10 to 200 atmospheres. The time in the reaction zone of the partial oxidation gas generator in seconds is in the range of about 0.5 to 20, such as normally about 1.0 to 5.

The effluent gas stream leaving the partial oxidation gas generator has the following composition in mole % (dry basis) depending on the amount and composition of the feedstreams: $H_2$ 8.0 to 60.0, CO 8.0 to 70.0, $CO_2$ 1.0 to 50.0, $CH_4$ 0.0 to 2.0, $H_2S$ 0.0 to 2.0, COS 0.0 to 1.0, $N_2$ 0.0 to 80.0, amd A 0.0 to 2.0.

The effluent gas stream leaving the reaction zone of the noncatalytic partial oxidation gas generator at a temperature in the range of about 1700° F. to 3500° F. may be either (1) quench cooled and scrubbed with water, (2) cooled in a gas cooler and then scrubbed with water, or both (1) and (2). Thus, as shown in coassigned U.S. Pat. No. 2,818,326 which is incorporated herein by reference, the hot effluent stream of gas from the reaction zone may be cooled to a temperature in the range of about 180° to 600° F. by direct contact with water in a quench tank. At least a portion of the entrained solids is thereby removed from the process gas stream by the turbulent quench water. Any remaining entrained solids may be removed from the process gas stream by additional scrubbbing with water in a gas scrubbing zone at a temperature in the range of about 100° to 600° F., and a pressure in the range of about 1–300 atmospheres. Suitably the pressure in the scrubbing zone is about the same as that in the gas generator, less ordinary pressure drop in the line. A pumpable dispersion of soot and water in which the soot is present in the range of about 0.1 to 3.0 wt. %, such as about 0.5 to 2.0 wt. %, say below about 1.5 wt. % are produced in the quench tank and scrubbing zone.

Alternatively, the effluent gas stream from the partial oxidation gas generator may be cooled to a temperature in the range of about 350° to 750° F. but above the dew point of water by indirect heat exchange with water in a gas cooler, such as shown and described in coassigned U.S. Pat. No. 3,709,669, which is incorporated herein by reference. By this means by-product steam for use elsewhere in the process may be produced. The cooled process gas stream is then cleaned by scrubbing with water in a conventional gas scrubbing zone. For example, a venturi or jet scrubber or gas scrubber may be used. By this means clean product gas and a dispersion of soot in water may be produced.

It is economically expedient in the subject process to resolve the soot-water dispersion from the quench and scrubbing operations and to recycle the components. Thus, clarified water may be recycled to the gas quench cooling and/or scrubbing operation(s). In the subject process, the carbon-soot is recovered as a pumpable dispersion of carbon-soot-heavy refinery fraction. Further, from about 0–100 wt. %, and preferably at least a portion of this dispersion comprising about 0–50 wt. %, such as about 5–30 wt. % of aromatic-rich hydrocarbon may be recycled to the gas generator as at least a portion of the hydrocarbonaceous feed. By this means, there may be no net production of carbon.

First, sufficient light liquid paraffinic hydrocarbon extractant at a temperature in the range of about 100° to 350° F. and preferably 180° to 290° F. is mixed with the soot-water dispersion at a temperature in the range of about 200° to 700° F. and preferably 250° to 400° F. in a two-stage decanting operation, such as described in co-assinged U.S. Pat. No. 4,038,186, which is incorporated herein by reference. Two feedstreams are simultaneously introduced into the decanter, such as shown in FIG. 1 of co-assigned U.S. Pat. No. 4,038,186. About 3–40 wt. % of the total light liquid paraffinic hydrocarbon extractant is mixed with all of the soot-water dispersion to comprise the first feed stream in which the weight ratio of liquid paraffinic hydrocarbon extractant to soot is in the range of about 1.5 to 15, such as about 3 to 8. The remainder of the light liquid paraffinic hydrocarbon extractant comprises the second feedstream.

The decanter is operated at a temperature in the range of about 150° to 650° F., and preferably above 250° F. The pressure in the decanter is basically set by the temperature. The pressure must be high enough to keep the light liquid paraffinic hydrocarbon extractant and the water from vaporizing in the decanter, e.g. 5 to 250 atmospheres depending upon the temperature. Thus, when the decanter bottoms outlet temperature is 300° F. and the liquid paraffinic hydrocarbon extractant is light straight run naphtha, the pressure in the decanter may be at least 300 psia. The volume of the decanter is such as to provide a sufficient residence time for phase separation to occur at a specified flow rate. Thus the residence time for the gray-water phase and the carbon-soot-liquid paraffinic hydrocarbon extractant phase in the decanter may be in the range of about 2 to 20 minutes and preferably about 6 to 15 minutes. The dispersion of carbon-soot-liquid paraffinic hydrocarbon extractant floats on the grey-water in the decanter.

The term light liquid paraffinic hydrocarbon extractant includes by definition butane, pentane, hexane, and light straight run naphtha, and mixtures thereof. Typical properties of the light liquid paraffinic hydrocarbon extractant follows:

| Boiling point, I.B.P.,atm. °F. | 100 to 200 |
|---|---|
| API Gravity about | 40 to 80 |
| Aromatics, wt % less than | 7 |

A pumpable dispersion stream of carbon-soot in light liquid paraffinic hydrocarbon extractant with or without small amounts of water is continuously removed from the top of the decanter at a temperature in the range of about 100° to 350° F., such as about 200° to 275° F. This dispersion comprises about 0.5 to 9.0 wt. % carbon-soot, such as about 0.5 to 5.0 wt. % soot, 0 to about 10 weight % water, and the remainder light liquid paraffinic hydrocarbon extractant. The light liquid paraffinic hydrocarbon extractant is separated from the carbon-soot in a conventional fractionation zone located downstream. The fractionation zone may comprise one or more fractionation columns.

A first single liquid phase pumpable mixture comprising about 40–95 wt. %, such as about 65–85 wt. % of fresh heavy refinery fraction and the remainder comprising an aromatic-rich hydrocarbon is prepared in a first mixing zone. Heavy refinery fractions that are solid at room temperature are first broken into small pieces. Suitable conventional mixing equipment may be used, depending on the temperature and viscosities of the materials being mixed. For example, a mixing or blending tank may be used with or without a recirculating pump and/or an internal heating coil or an externally fired heater. The viscosity of the first single liquid phase pumpable mixture is preferably less than 300 centistokes, such as less than 150 centistokes at a temperature of about 450° F., or above. The temperatures and weight ratios of the streams being mixed are adjusted to achieve proper mixing and pumpability.

Suitable aromatic-rich hydrocarbons include pumpable liquid hydrocarbons containing from about 20–100 wt. %, such as 30–95 wt. % aromatics. The boiling point of the aromatic-rich hydrocarbon is less than that of the heavy refinery fraction. Two types of aromatic-rich hydrocarbons are included by definition. Type I materials are single ring aromatic liquid hydrocarbons, i.e. benzene, toluene, xylene, and mixtures thereof in which the aromatic content is in the range of about 95–100 wt. %. Type II materials are liquid hydrocarbons that contain single and multi-ring aromatics such as listed in Table 4 of ASTM D3239 and incorporated herein by reference and which includes heavy and light cycle gas oils, vacuum gas oils, and gas oils from a fluid catalytic cracking unit (FCCU) or a crude still, and mixtures thereof. The aromatic content of Type II materials is in the range of about 20–60 wt. %. Typical properties of the aromatic-rich liquid hydrocarbons follows:

| Boiling Point, IBP atm. °F. | |
|---|---|
| Type I | about 95 to 115, such as about 100 to 110 |
| Type II | about 320 to 1100, such as about 500 to 900 |
| API Gravity at 60° F. | |
| Type I | about 75 to 85, such as about 79 to 82 |
| Type II | about 10 to 40, such as about 25 to 35 |

The first single liquid phase pumpable mixture at a temperature in the range of about 250° F. to 550° F., such as about 400° F.–500° F., is then mixed with the overhead dispersion from the decanter comprising carbon-soot, light liquid paraffinic hydrocarbon, and any carry-over water to produce a second mixture which is introduced into a fractionation column. The weight ratio of heavy refinery fraction to aromatic-rich hydrocarbon in the first mixture is such that the second mixture is also a single liquid phase pumpable liquid. There is no precipitation of asphaltenes. For example, the second mixture may comprise about 2 to 85 wt. %, such as about 10 to 50 wt. % of first mixture and the remainder comprises said overhead dispersion from the decanter. Actual wt. ratios of the components may be determined experimentally based on such variables as the asphaltene content of the heavy refinery fraction, the aromatic content of the aromatic-rich hydrocarbon, temperature, viscosity, and the amount of carbon-soot in the second mixture.

The second mixture may be optionally preheated to a temperature in the range of about 175° F. to 800° F., such as about 230° F. to 725° F. before being introduced into the fractionation zone. The amount of heavy petroleum refinery fraction in the feed mixture to the fractionator is such that the dispersion stream leaving at or near the bottom of the fractionator is pumpable at the discharge temperature and comprises a heavy refinery fraction containing carbon-soot in the amount of about 0.5–25 weight %, such as about 1.0 to 12.0 wt. %, say about 2–5 wt. %, and may or may not contain aromatic-rich hydrocarbon. This slurry stream may be removed from the bottom of the fractionation column at a temperature in the range of about 375° F. to 1300° F., such as about 400° F. to 900° F. Separation of the liquid components in the second mixture by means of conventional fractionation may be facilitated by selecting the components so that their respective boiling points differ by about 25° F. or more. The pressure in the fractionating zone may vary in the range of about 25 atmospheres to a vacuum, such as about 1–5 atmospheres.

About 0 to 100 wt. %, such as at least a portion i.e. about 10 to 100 wt. %, and preferably about 100 wt. % of the aromatic-rich hydrocarbon is separated and removed from the fractionation zone at a temperature in the range of about 175° F.–800° F., such as about 175° F.–350° F. for benzene, toluene and xylene; and about 350° F.–1100° F. for cycle gas oils. The separated aromatic-rich hydrocarbon is then recycled for mixing with the fresh heavy refinery fraction. The remainder, if any, of the aromatic-rich hydrocarbon is removed from the bottom or bottom portion of the fractionator in admixture with the heavy refinery fraction. The split is determined by the amount of aromatic-rich hydrocarbon required to produce the aforesaid first and second pumpable mixtures and the pumpable bottoms dispersion.

Substantially all of the comparatively small amount of water that may enter the fractionator dispersed in the second mixture, and any H₂O introduced by the optional steam distillation procedure, may be preferably removed with the stream of light paraffinic hydrocarbon whose boiling point is usually less than that of the aromatic-rich hydrocarbon. In one embodiment, the boiling point of the aromatic-rich hydrocarbon is close to that of water and at least a portion of the water may be removed with the stream of light low boiling aromatic-rich hydrocarbon leaving the fractionator. This stream is then cooled, condensed, and the aromatic-rich hydrocarbon is separated from the water and recycled to the mixing zone for admixture with the heavy refinery fraction.

From about 0–100 wt. %, such as at least a portion i.e. about 10–100 wt. %, say about 50–90 wt. % of the bottoms slurry stream may be recycled to the gas generator. At least a portion i.e. about 10–100 wt. %, such as about 30–90 wt. % of the fuel feed to the gas generator may be thereby provided. In one embodiment all of the bottoms slurry stream with substantially no reduction in temperature is recycled to the gas generator to provide at least a portion of and preferably all of the fuel feed. Advantageously, such a feedstream is already preheated. The remainder of the bottoms slurry stream, if any, may be used elsewhere in the process, for example as a fuel for the fired heaters, and/or for export as fuel.

In another embodiment, the fractionator is continuously fed with a mixture comprising Type II aromatic-rich hydrocarbons, as previously described, in admixture with a separate portion of heavy refinery fraction and the dispersion of carbon-soot and light liquid paraffinic hydrocarbon. A separate portion of the heavy refinery fraction may be continuously introduced into the gas generator. A stream of light liquid paraffinic hydrocarbon and any water is continuously distilled off of the fractionator and cooled, condensed, and separated. The light liquid paraffinic hydrocarbon is then recycled to the decanter inlet. A pumpable mixture comprising carbon-soot, substantially all of the Type II aromatic-rich hydrocarbon, and the heavy refinery fraction is continuously removed from the bottom or bottom section of the fractionator. This bottoms stream may be exported for use as fuel oil. From about from 0 to 100 wt. %, such as at least a portion i.e. about 10–100 wt. % of this bottoms stream may be recycled to the gas generator. The remainder of the bottoms slurry stream, if any, may be used elsewhere in the process as a fuel and/or for export as fuel.

Advantageously, in the subject process when the aforesaid xixture of heavy refinery fraction and aromatic-rich hydrocarbon is mixed with the dispersion of carbon-soot and light liquid paraffinic hydrocarbon, a second liquid phase does not form. Unexpectedly, there is no precipitation of asphaltenes nor increase in viscosity of the mixture. Plugging problems in the fractionation column and carry-over of carbon are thereby avoided.

DESCRIPTION OF THE DRAWING

A more complete understanding of the invention may be had by reference to the accompanying drawing which illustrates a preferred embodiment of the invention. Although the drawing illustrates a preferred embodiment of the invention, it is not intended to limit the subject invention to the particular apparatus or materials described.

A stream of soot-water dispersion in line 1 from a conventional quench tank and/or gas scrubber used to quench cool and/or scrub the raw effluent gas stream from the reaction zone of a conventional free-flow non-catalytic partial oxidation gas generator is mixed in line 2 with a portion of light liquid paraffinic hydrocarbon extractant, for example light straight run naphtha from line 3, valve 4, lines 5–7, and separation tank 8. Make-up liquid paraffinic hydrocarbon extractant is introduced into the system through line 9, valve 10, and line 11.

The soot-water-extractant mixture in line 2 is passed through inlet 15 of decanter 16, the annular passage between outer pipe 17 and inner pipe 18 and is then discharged through lower horizontal radial nozzle 19. Simultaneously, a second stream of light liquid paraffinic hydrocarbon extractant from separator 8 is passed into decanter 16 by way of lines 7, 6, and 20, valve 21, line 22, and inlet 23. The extractant is passed up through pipe 18 and is then discharged through upper horizontal radial nozzle 30.

Separation takes place in the decanter. A pool of grey water 31 forms at the bottom of the decanter, and a dispersion of particulate carbon, soot and light liquid paraffinic hydrocarbon 32 floats on top of grey water 31 at the interface level 33. A stream of grey water is removed from the bottom of decanter 16 by way of outlet 34 and line 35. Most of the grey water is recycled to the hot raw gas quench cooling and/or scrubbing zone (not shown) by way of line 24, valve 25, and line 26. The remainder of the stream of grey water is sent to a waste water treatment facility (not shown) by way of line 27, valve 28, and lines 29 and 14. A stream of dispersion comprising carbon-soot, light liquid paraffinic hydrocarbon, and water, if any, is removed from decanter 16 by way of upper outlet 37, line 38, and passed into venturi mixer 39.

A first pumpable single liquid phase mixture is produced by passing a stream of heavy fuel fraction from a petroleum refinery in line 40, into mixing zone 41 where it is mixed with a stream of aromatic-rich hydrocarbon liquid or vapor. For example, aromatic-rich hydrocarbon vapor may be supplied to line 42 from line 43, open valve 44, lines 45–46, open valve 47, line 48 and fractionation column 49. In such case valves 50 and 51 are closed. Alternatively, the aromatic-rich hydrocarbon in line 42 may be in liquid phase. In such case, with valves 44 and 51 closed and 47 and 50 open, the aromatic-rich hydrocarbon vapor in line 48 is passed through lines 46, 55, 56 and condensed in cooler 57. The liquid aromatic-rich hydrocarbon in line 58 is passed into tank 59 and then through lines 60, valve 61, line 62, and lines 63 and 42 into mixing zone 41.

Depending on the amount of aromatic-rich hydrocarbon that is necessary to be mixed with the heavy refinery fraction to provide the first pumpable mixture of desired viscosity in line 70 and the second pumpable mixture of single liquid phase material of desired viscosity in line 71 and the amount of fresh aromatic-rich hydrocarbon entering the system through line 64, from about 0-100 wt. % of the aromatic-rich hydrocarbon entering fractionator 49 is removed through line 48. The remainder, if any, of the aromatic-rich hydrocarbon is removed through line 100 in admixture with the bottoms stream to be further described.

In another embodiment, valves 44, 47, and 61 are closed and valve 51 is open. The fresh aromatic-rich hydrocarbon continuously enters the system through lines 64, 65, 63 and 42. In such case, all of the aromatic-rich hydrocarbon may leave fractionator 49 through line 100 at the bottom of fractionator 49 in admixture with the dispersion of heavy refinery fraction and carbon-soot. The pumpable mixture in line 100 may be used as a fuel. Alternatively, at least a portion may be recycled to the gas generator as at least a portion of the feed.

The previously described first mixture comprising heavy refinery fraction and aromatic-rich hydrocarbon from mixing zone 41 is pumped through line 70 and into mixer 39 where it is mixed with the overhead dispersion from decanter 37 comprising carbon-soot, light liquid paraffinic hydrocarbon and water, if any, from line 38 to produce a second pumpable mixture comprising a single liquid phase dispersion of carbon-soot. The second mixture is passed into fractionator 49 by way of lines 71-72, open valve 73, and line 74-75, pressure reducing valve 76, and line 77. In such case valve 78 would be closed. Optionally, by closing valve 73 and opening valve 78 the second mixture in line 71 may be preheated by being passed through lines 79, 80, heater 81, and line 82. Fractionator 49 is equipped with reboiler 85. Optionally, steam may be introduced through line 86, valve 87, and line 88.

A stream of light paraffinic hydrocarbon extractant vapors is removed by way of line 89 at the top of fractionator 49, cooled below the dew point in cooler 90, and passed into separator 8 by way of line 91. Any water settles to the bottom of separator 8, and is removed through line 92. The water in line 92 is sent to the waste water treatment facility (not shown) by way of line 14. First and second streams of light liquid paraffinic hydrocarbon extractant are simultaneously removed from separator 8. The first stream is removed through line 7 and is recycled to the decanter as previously described. The second stream of light liquid paraffinic hydrocarbon extractant is recycled to fractionation column 49 by way of line 93, valve 94, and line 95. Uncondensed gases selected from the group consisting of $H_2S$, $NH_3$, $CO_2$, and hydrocarbon vapors are removed through line 96 and may be sent to a Claus operation (not shown) for recovery of sulfur, or sent to flare.

A pumpable slurry stream of heavy refinery fraction and carbon-soot with or without all or a portion of the aromatic-rich hydrocarbon that is introduced into the fractionator may be removed at the bottom of or the lower portion of the fractionation column through line 100. From about 0-100 wt. % of the slurry stream in line 100 is pumped through line 101 to the partial oxidation gas generator. The remainder, if any, of the slurry stream in line 100 is removed through line 102, valve 103, and line 104. This material may be used as fuel in heaters 81 and/or 85 or exported.

EXAMPLE

The following example illustrates a preferred embodiment of the process of this invention as related to FIG. 1 of the drawing. The example should not be construed as limiting the scope of the invention. The process is continuous and the flow rates are specified on an hourly basis for all streams of materials.

371.4 lbs. of the bottoms from a solvent deasphalting process (SDA) having the properties shown in Table 1 below are mixed in a first mixing zone with 92.9 lbs. of heavy cycle gas oil (HCGO) from a fluid catalytic cracking unit (FCCU) having the properties shown in Table 1 to produce a pumpable single liquid phase first mixture at a temperature of 400° F.

TABLE I

|  | SDA Bottoms | FCCU HCGO |
|---|---|---|
| Gravity, API @ 60° F. | −6.7 | 10.8 |
| Ultimate Analysis, % |  |  |
| C | 85.70 | 88.82 |
| H | 9.37 | 9.42 |
| N | 1.52 | 0.28 |
| S | 2.52 | 1.07 |
| Ash | 0.28 | 0.006 |
| O | 0.61 |  |
| Ball & Ring Softening Point, °F. | 194 |  |
| Viscosity-Centistokes, 415° F. | 182 |  |
| Viscosity SSF @ 122° F. |  | 12.2 |
| ASTM Distillation - °F. |  |  |
| IBP |  | 440 |
| 5% |  | 550 |
| 10% |  | 580 |

The aforesaid pumpable single liquid phase first mixture is mixed with 318.9 lbs. of a dispersion from a decanter comprising 7.4 lbs. of carbon-soot, 295.6 lbs. of light straight run naphtha, and 15.9 lbs. of water to produce a second single liquid phase pumpable mixture. There is no precipitation of asphaltenes. The light straight run naphtha has an API gravity of 40 min. The second mixture at a temperature of 498° F. is flashed into a fractionation column operating at 19 psig. The reflux ratio of the naphtha stream is 0.55 lb/lb.

The following streams are removed from the fractionation column:

(a) 295.6 lbs. of light straight run naphtha in admixture with 15.0 lbs. of water at a temperature of 265° F. After separation from the water, about 51.7 lbs. of the light straight run naphta is recycled and mixed with about 369 lbs. of carbon-soot water. Simultaneously, about 243.9 lbs. of the light straight run naphtha are separately introduced into the decanter;

(b) about 92.9 lbs. of the FCCU heavy cycle gas oil as described in Table 1 at a temperature of about 650° F. This stream is recycled to said first mixing zone for mixing with said bottoms from a solvent deasphalting process to produce said first mixture; and (c) about 378.8 lbs. of a pumpable dispersion comprising 1.95 wt. % carbon-soot and the remainder comprising said bottoms from a solvent deasphalting process (SDA in Table 1) at a temperature of about 700° F.

All of the pumpable dispersion in (c) is introduced into a free-flow noncatalytic partial oxidation gas generator operating at a temperature of 1961° F. and a pressure of 700 psig, along with 182.0 lbs. of steam and 403.6 lbs. of substantially pure oxygen i.e. 99.9 mole % $O_2$. 18,178 standard cubic feet per hour of synthesis gas (dry basis) are produced by partial oxidation having the following analysis in mole % (dry basis):

| | |
|---|---|
| $H_2$ | 44.022 |
| CO | 47.984 |
| $CO_2$ | 7.023 |
| $N_2$ | 0.279 |
| A | 0.078 |
| $CH_4$ | 0.296 |
| $H_2S$ | 0.281 |
| COS | 0.031 |

In addition 102.9 lbs. of $H_2O$ and 7.4 lbs. of unconverted soot are included in the stream of raw synthesis gas. With respect to performance, advantageously the cold gas efficiency of the process i.e. BTU $(H_2+CO)$/BTU fuel $\times 100$ of 83.85% is high; and, the specific oxygen consumption i.e. standard cubic ft. of oxygen consumed per thousand standard cubic feet of $H_2+CO$ produced, of 285.8 is comparatively low. Further, an efficient light paraffinic hydrocarbon extractant and a comparatively low cost heavy refinery fraction having a comparatively high asphaltene content are used together in this partial oxidation process without precipitation of the asphaltenes. Clogging of pumps and other operational problems are thereby avoided.

Although this invention has been illustrated by reference to specific embodiments, it will be apparent to those skilled in the art that various changes and modifications may be made which clearly fall within the scope of this invention.

We claim:

1. In the process for the partial oxidation of a hydrocarbonaceous fuel with a free oxygen-containing gas in the reaction zone of a free-flow noncatalytic gas generator at a temperature in the range of about 1700° to 3500° F. and a pressure in the range of about 1 to 300 atmospheres in the presence of a temperature moderator to produce a raw gas stream comprising $H_2$, CO, $H_2O$ and at least one gas from the group $CO_2$, $H_2S$, COS, $CH_4$, $N_2$, A, and containing entrained soot; contacting the raw gas stream with water in a gas quenching and/or scrubbing zone to produce a soot-water dispersion; separating said soot in a decanting zone; and recycling at least a portion of said soot to said gas generator as a portion of the feed, the improvement comprising:

(1) mixing a stream of said soot-water dispersion with a first stream of light paraffinic hydrocarbon extractant, and introducing said mixture into a decanter along with a second stream of light paraffinic hydrocarbon extractant; wherein said light paraffinic hydrocarbon extractant is selected from the group consisting of butane, pentane, hexane, light straight run naphtha, and mixtures thereof;

(2) removing from said decanter a stream of particulate carbon and soot dispersed in light paraffinic hydrocarbon extractant, and a separate stream of ash dispersed in grey water;

(3) mixing together an asphaltene containing heavy refinery fraction having an initial boiling point in the range of about 650° F.-1300° F. and being selected from the group consisting of very heavy residua from the refining of petroleum, asphalt residuum from solvent deasphalting and the bottoms product from the hydrogenation and hydrocracking of residua or heavy crude oil with an aromatic-rich hydrocarbon liquid or vapor containing from about 20-100 wt. % aromatics to produce a first single liquid phase pumpable mixture;

(4) mixing together the mixture from (3) with the dispersion of particulate carbon-soot-light paraffinic hydrocarbon extractant from (2) to produce a second single liquid phase pumpable mixture with no precipitation of asphaltenes; and (5) separating the mixture from (4) in a fractionation zone and removing (a) a stream of light paraffinic hydrocarbon extractant, and recycling said stream to (1) as said first and second streams of extractant; (b) a stream comprising at least a portion of the aromatic-rich hydrocarbon, and recycling at least a portion of said stream to (3); and (c) a pumpable dispersion comprising particulate carbon-sootheavy refinery fraction and the remainder of the aromatic-rich hydrocarbon, if any, and recycling from about 0 to 100 wt. % of said stream to the partial oxidation gas generator, and removing the remainder, if any, of said dispersion stream.

2. The process of claim 1 wherein the pentane insolubles of the heavy refinery fraction are in the range of about 5-50 weight percent.

3. The process of claim 1 wherein the aromatic-rich hydrocarbons are single ring compounds.

4. The process of claim 3 wherein said aromatic-rich hydrocarbons are selected from the group consisting of benzene, toluene, xylene, and mixtures thereof.

5. The process of claim 1 wherein said aromtic-rich hydrocarbons are selected from the group consisting of heavy cycle gas oil, light cycle gas oil, vacuum gas oil, gas oil from a fluid catalytic cracking unit, crude still gas oil, and mixtures thereof.

6. The process of claim 1 where from about 10 to 100 wt. % of the aromatic-rich hydrocarbon separated in (5) (b) is recycled to (3).

7. The process of claim 1 where the mixture produced in (3) comprises about 40-95 wt. % of heavy refinery fraction and the remainder comprises aromatic-rich hydrocarbon.

8. The process of claim 1 wherein the remainder of the pumpable dispersion removed in (5) (c) is used as fuel in the system and/or for export.

9. The process of claim 1 where in (3) said pumpable mixture is a single liquid phase mixture comprising about 65-85 wt. % of fresh heavy refinery fraction and the remainder comprising an aromatic-rich hydrocarbon.

10. The process of claim 1 where the stream of particulate carbon and soot dispersed in light paraffinic hydrocarbon extractant from (2) includes 0 to about 10 wt. % of $H_2O$, and provided with the steps of removing any $H_2O$ if present along with said stream of light paraffinic hydrocarbon extractant in (5) (a), and separating the $H_2O$ from the light paraffinic hydrocarbon prior to recycling said light paraffinic hydrocarbon to (1) as said first and/or second streams of light paraffinic hydrocarbon extractant.

11. The process of claim 1 wherein from about 10 to 100 wt. % of the pumpable dispersion produced in (5) (c) is recycled to the gas generator as at least a portion of the fuel feed.

12. In a process for the partial oxidation of a hydrocarbonaceous fuel with a free oxygen-containing gas in the reaction zone of a free-flow noncatalytic gas generator at a temperature in the range of about 1700° to 3500° F. and a pressure in the range of about 1 to 300 atmospheres in the presence of a temperature moderator to produce a raw gas stream comprising $H_2$, $CO$, $H_2O$, and at least one gas from the group $CO_2$, $H_2S$, $COS$. $CH_4$, $N_2$, A, and containing entrained soot; contacting the raw gas stream with water in a gas quenching and/or scrubbing zone to produce a soot-water dispersion; separating said soot in a decanting zone; and recycling at least a portion of said soot to said gas generator as a portion of the feed, the improvement comprising:

(1) mixing a stream of said soot-water dispersion with a first stream of light paraffinic hydrocarbon extractant, and introducing said mixture into a decanter along with a second stream of light paraffinic hydrocarbon extractant; wherein said liglt paraffinic hydrocarbon extractant is selected from the group consisting a butane, pentane, hexane, light straight run naphtha, and mixtures thereof;

(2) removing from said decanter a stream of particulate carbon and soot dispersed in light paraffinic hydrocarbon extractant, and a separate stream of ash dispersed in grey water;

(3) mixing together as asphaltene containing heavy refinery fraction having an initial boiling point in the range of about 650° F.–1300° F. and being selected from the group consisting of very heavy residua from the refining of petroleum, asphalt residuum from solvent deasphalting and the bottoms product from the hydrogenation and hydrocracking of residua or heavy crude oil with an aromatic-rich hydrocarbon selected from the group consisting of heavy cycle gas oil, light cycle gas oil, vacuum gas oil, gas oil from a fluid catalytic cracking unit, crude still gas oil, and mixtures thereof to produce a first single liquid phase pumpable mixture; with the (4) mixing together the mixture from (3) with the dispersion of particulate carbon-soot-light paraffinic hydrocarbon extractant from (2) to produce a second single liuqid phase pumpable mixture with no precipitation of asphaltenes; and (5) separating the mixture from (4) in a fractionation zone and removing (a) a stream of light paraffinic hydrocarbon extractant, and recycling said stream to (1) as said first and second streams of extractant; and (b) a pumpable dispersion of particulate carbon-soot-heavy refinery fraction and all of the aromatic-rich hydrocarbon, and recycling from about 0 to 100 wt. % to said stream to the partial oxidation gas generator, and removing the remainder, if any, of said dispersion stream.

13. The process of claim 12 where the stream of particulate carbon and soot dispersed in light paraffinic hydrocarbon extractant from (2) includes 0 to about 10 wt. % of $H_2O$, and provided with the steps of removing any $H_2O$ if present along with said stream of light paraffinic hydrocarbon extractant in (5) (a), and separating the $H_2O$ from the light paraffinic hydrocarbon prior to recycling said light paraffinic hydrocarbon to (1).

14. The process of claim 12 wherein the remainder of the pumpable dispersion removed in (5) (b) is used as fuel in the system and/or for export.

15. The process of claim 12 wherein at least a portion of the pumpable dispersion produced in (5) (b) is recycled to the gas generator as at least a portion of the fuel feed.

16. The process of claim 1 where in (4) the first single liquid phase pumpable mixture at a temperature in the range of about 250° F. to 550° F. is mixed with said dispersion of particulate carbon-soot-light paraffinic hydrocarbon extractant from the decanter which is operated at a temperature in the range of about 150° F. to 650° F.

* * * * *

UNITED STATES PATENT AND TRADEMARK OFFICE
CERTIFICATE OF CORRECTION

PATENT NO. : 4,462,928
DATED : July 31, 1984
INVENTOR(S) : R. M. Dille, H. A. Rhodes, and S. B. Wallon It is certified that error appears in the above—identified patent and that said Letters Patent is hereby corrected as shown below:

<u>Column 11</u> line 37    after "3500" replace "∞" with the symbol for for degrees --°-- line 40    after "$H_2S$" replace period "." with a comma --,--

<u>Column 13</u> line 2    after "COS" replace period "." with a comma --,-- line 15    after "consisting" replace "a" with --of-- line 21    after "together" replace "as" with --an-- line 34    after "mixture;" delete "with the"

<u>Column 14</u>    replace "liuqid" with -- liquid -- line 11, after "%" replace "to" with -- of --

Signed and Sealed this

Seventh Day of May 1985

[SEAL]

Attest:

DONALD J. QUIGG

Attesting Officer    Acting Commissioner of Patents and Trademarks